United States Patent
Hagendorf et al.

(10) Patent No.: US 12,441,558 B2
(45) Date of Patent: Oct. 14, 2025

(54) METHOD AND APPARATUS FOR CONVEYING HOT CALCINED RAW MEAL

(71) Applicant: ALITE GmbH, Neustadt (DE)

(72) Inventors: Moritz Hagendorf, Neustadt (DE); Jörg Hammerich, Neustadt (DE)

(73) Assignee: ALITE GmbH, Neustadt (DE)

( * ) Notice: Subject to any disclaimer, the term of this patent is extended or adjusted under 35 U.S.C. 154(b) by 0 days.

(21) Appl. No.: 18/669,496

(22) Filed: May 20, 2024

(65) Prior Publication Data
US 2025/0019186 A1    Jan. 16, 2025

Related U.S. Application Data

(63) Continuation of application No. PCT/EP2022/082669, filed on Nov. 21, 2022.

(30) Foreign Application Priority Data

Nov. 23, 2021  (EP) ..................................... 21209799

(51) Int. Cl.
*B65G 51/03*   (2006.01)
*B65G 53/38*   (2006.01)

(52) U.S. Cl.
CPC ............. *B65G 51/03* (2013.01); *B65G 53/38* (2013.01); *B65G 2201/042* (2013.01)

(58) Field of Classification Search
None
See application file for complete search history.

(56) References Cited

U.S. PATENT DOCUMENTS

| | | | |
|---|---|---|---|
| 3,645,581 A * | 2/1972 | Lasch, Jr. | H01L 21/6779 406/72 |
| 3,813,210 A | 5/1974 | Miskolczy et al. | |
| 8,371,773 B2 * | 2/2013 | Bryan, Jr. | B65G 11/203 406/84 |
| 9,114,940 B2 * | 8/2015 | Kraegeloh | A63F 3/00 |
| 9,254,968 B2 * | 2/2016 | Garner | B65G 21/2036 |
| 9,513,058 B2 * | 12/2016 | Hammerich | F27D 15/022 |

(Continued)

FOREIGN PATENT DOCUMENTS

| | | |
|---|---|---|
| CN | 201580809 U | 9/2010 |
| CN | 202321645 U | 7/2012 |

(Continued)

OTHER PUBLICATIONS

Geldart, D., Types of Gas Fluidization, Powder Technology, 1973, 7(5):285-292.

(Continued)

*Primary Examiner* — Joseph A Dillon, Jr.
(74) *Attorney, Agent, or Firm* — Quarles & Brady LLP; Yakov S. Sidorin (57) ABSTRACT

Methodology for conveying hot Geldart group C materials. A slide plate for a slide of a conveyor for Geldart group C materials having a longitudinal axis, an up-facing surface for supporting the Geldart group C materials, a lower surface, a front-end surface and a rear-end surface may have a significantly reduced slope if the slide plate is made of a ceramic refractory such that the slide plate has a number of through holes configured to provide fluid communication between fluid inlets in the lower surface and fluid outlets in the up-facing surface.

12 Claims, 7 Drawing Sheets

(56) References Cited

U.S. PATENT DOCUMENTS

| | | | | |
|---|---|---|---|---|
| 9,598,247 | B2* | 3/2017 | Zonenberg | B65G 51/03 |
| 9,656,814 | B2* | 5/2017 | Kraegeloh | A63F 3/00697 |
| 10,214,363 | B1* | 2/2019 | Clare | F16C 32/0614 |
| 10,401,089 | B2* | 9/2019 | Windmöller | C04B 7/48 |
| 10,989,476 | B2* | 4/2021 | Hammerich | F27B 7/383 |
| 2009/0003942 | A1 | 1/2009 | Salmento et al. | |
| 2009/0110529 | A1* | 4/2009 | Browne | B65G 53/16 |
| | | | | 414/676 |
| 2012/0051849 | A1* | 3/2012 | Barrios | B65G 43/00 |
| | | | | 406/197 |
| 2019/0024976 | A1 | 1/2019 | Lebaek et al. | |

FOREIGN PATENT DOCUMENTS

| | | |
|---|---|---|
| CN | 210339574 U | 4/2020 |
| FR | 2921059 A1 | 3/2009 |
| WO | 2010127771 A1 | 11/2010 |
| WO | 2017125579 A1 | 7/2017 |

OTHER PUBLICATIONS

Lehne, J. et al., Making Concrete Change—Innovation in Low-carbon Cement and Concrete, Chatham House Report, 2018, 138 pages.

Olivier, J. et al., Trends in Global CO2 Emissions, 2016 Report, PBL Netherlands Environmental Assessment Agency, 86 pages.

European Patent Office, Extended Search Report, Application No. 21209799.2, May 24, 2022, 8 pages.

PCT International Search Report and Written Opinion, PCT/EP2022/082669, Mar. 13, 2023, 10 pages.

* cited by examiner

METHOD AND APPARATUS FOR CONVEYING HOT CALCINED RAW MEAL

CROSS-REFERENCE TO RELATED APPLICATIONS

This US Patent Application is a continuation of the pending International Patent Application No. PCT/EP2022/082669 filed on Nov. 21, 2022 and now published as WO 2023/094329, which designates the United States and claims priority from the European Patent Application No. 21209799.2 filed on Nov. 23, 2021. The disclosure of each of the above-identified patent documents is incorporated herein by reference.

1. FIELD OF THE INVENTION

The invention relates to a method and an apparatus for conveying hot Geldart group C materials. In particular, the invention relates to a slide plate for a slide for Geldart group C materials, a slide with the slide plate and a method of conveying hot Geldart group C materials.

2. DESCRIPTION OF RELATED ART

Conveying particulate matter is a common problem in many technical fields and many different apparatuses and means have been suggested. In cases where the particulate matter is extremely hot or cold, abrasive, corrosive or for other reasons difficult to handle by mechanical conveying means such as screw conveyors or belt conveyors a common approach is to fluidize the particulate matter and then let it slide (air-gravity conveying) or to blow the fluidized matter (air-jet conveying). If fluidization is an option or not, depends on the so called "Geldart group" to which the material is associated. As found by D. Geldart, particulate materials can be characterized by their ability to be fluidized: "The behavior of solids fluidized by gases falls into four clearly recognizable groups, characterized by density difference $(\rho_s-\rho_f)$ and mean particle size. The most easily recognizable features of the groups are: powders in group A exhibit dense phase expansion after minimum fluidization and prior to the commen[ce]ment of bubbling; those in group B bubble at the minimum fluidization velocity: those in group C are difficult to fluidize at all and those in group D can form stable spouted beds." (D. Geldart: *Types of gas fluidization*, Powder Technology, Vol. 7, No. 5, 1973, p. 285-292).

One example of a Geldart group C material is cement clinker raw meal ('raw meal' for short), which is an intermediate product in modern cement clinker lines. Raw meal may be uncalcined, partially calcined or at least almost fully calcined. In present state of the art cement clinker lines, the hot calcined raw meal exits a direct heat exchanger, the so called calciner, and is transported by the fumes produced in the calciner (fume jet transport) to a cyclone. In the cyclone, the hot raw meal is separated from the fumes and falls down into the raw-meal inlet of the kiln. A problem of this process is the $CO_2$ emission of the direct heat exchange calciner and the kiln: It has been estimated that about 8% of the overall man-made $CO_2$ emission is associated to the cement clinker manufacturing process (Olivier, Janssens-Maenhout, Muntean and Peters, *Trends in global CO2 emissions: 2016 Report*, The Hague: PBL Netherlands Environmental Assessment Agency, available at edgar.jrc.ec.europa.eu/news_docs/jrc-2016-trends-in-global-co2-emissions-2016-report-103425.pdf, accessed 22 Jan. 2020, page 65). As already apparent, the $CO_2$ emission of the cement clinker process is in part inherent to the process, as limestone ($CaCO_3$) is calcined into lime (CaO) in the calciner, thereby releasing $CO_2$. The corresponding chemical reaction is described by the formula $CaCO_3+heat \rightarrow CaO+CO_2$ and is thus an endothermal chemical reaction. This reaction is herein referred to as calcination. Another portion of the $CO_2$ is produced by burning fuel to provide the thermal energy driving the above endothermic calcination in the calciner, to sinter the lime with the other constituents of the raw meal to clinker in the kiln and to produce the electrical power for operating the plant. Depending on the design and operating parameters of a cement clinker line, approximately 50-60% of the released $CO_2$ are released in the calcination step. The other approximately 50-40% are released by said burning fuel (see e.g., Johanna Lehne and Felix Preston, *Making Concrete Change Innovation in Low-carbon Cement and Concrete*, Chatham House Report, London 2018).

It has been suggested to capture and store the $CO_2$ produced in the clinker manufacturing process. A promising approach for capturing the $CO_2$ is the so-called Regenerative Calcium Cycle (RCC). The RCC consists essentially of capturing $CO_2$ in flue gases by an exothermal reaction of the $CO_2$ with CaO to $CaCO_3$. The reaction reads $CaO+CO_2 \rightarrow CaCO_3+heat$, is thus exothermal and referred to as carbonation. Subsequently, the $CaCO_3$ is decarbonized (i.e., calcined) in a calciner, thereby releasing $CO_2$ and CaO, enabling to thereby obtain at least essentially pure $CO_2$. The $CO_2$ can be stored, e.g., in geological formations (commonly referred to as $CO_2$-sequestration) or used in other processes. In any case it is not released to the environment. The CaO can be subjected to carbonation, again.

As suggested in FR 2 921 059 A1, the RCC can be integrated into the cement clinker process, i.e., the calciner for (pre-) calcination of the raw meal is the source of the CaO being required in the carbonation step of the RCC. The $CaCO_3$ obtained in the carbonation step is subsequently provided to the calciner to obtain fresh CaO, i.e., a portion of the $CaO/CaCO_3$ circles in the process. In this approach, preheated raw meal is provided to a calciner, wherein in this process the calciner is necessarily an indirect heat exchanger for heating the $CaCO_3$. This enables to remove almost pure $CO_2$ from the calciner. This almost pure $CO_2$ can be stored or used for other industrial or agricultural purposes. A first portion of the calcined raw meal is provided to the kiln to complete the transformation of the raw meal into clinker. The remaining portion of the calcined raw meal is provided to a carbonator. In the carbonator, the CaO in the calcined raw meal reacts with the $CO_2$ contained in the flue gases from the kiln to $CaCO_3$. The flue gases from the kiln are thus subjected to $CO_2$-removal. The $CO_2$ bound in $CaCO_3$ produced in the carbonator is added to the raw meal entering the calciner, where the $CO_2$ is released. Thus, essentially all $CO_2$ being produced in the cement clinker process can be separated and stored or used as source for the chemical industry.

U.S. Pat. No. 3,813,210 A suggests a kiln for converting raw meal into cement clinker. The kiln has two portions, namely an elongated, stationary, inclined through having a perforated floor for supporting the raw meal and a rotary kiln for sintering calcined raw meal into clinker. In the through, the raw meal is first preheated and subsequently calcined by providing a flow of a hot gas from a combustion chamber below the perforated floor into the raw meal. From the calciner section of the through the calcined raw meal is directly provided to the inlet of the rotary kiln.

WO 2017/125579 suggests a cement clinker plant with a U-shaped reactor for drying municipal waste by the addition of preheated raw meal in a first leg of the U-shaped reactor. In the second leg, the dried waste is pyrolyzed. The such obtained product gas is provided to a calciner. The two legs are connected by an inclined perforated floor via which gas is injected in pulses to enhance a flow of material from the first to the second leg.

SUMMARY OF THE INVENTION

The invention is based on the observation that the teaching of FR 2 921 059 A1 is conceptual and that its practical implementation reveals new technical problems one of which is to convey the calcined raw meal—a Geldart group C material—to the kiln's raw meal inlet (kiln inlet, for short) without cooling it down, as the calcined raw meal is no longer transported by the fumes of the calciner. The technically simplest solution would be to store the calcined raw meal until it cooled down to a temperature allowing for an easy handling of the calcined raw meal. This approach, however, is inefficient as the raw meal has to be heated up again requiring heating installations and causing a significant increase in energy consumption. Embodiments of the invention thus provide a slide plate for the slide of the conveyor, a slide for the conveyor, and a method for conveying a Geldart group C material, for example calcined raw meal as provided, e.g., by an RCC process, to a kiln inlet while keeping installation cost as well as operating costs for the apparatus low.

The solution is based on the observation, that pre-calcined raw meal is a Geldart group C powder and hence very difficult, if not impossible to fluidize without additional mechanical agitation due to the cohesion between the powder particles. A fluidization-based air-gravity conveying mechanism is thus not promising. As well due to the cohesion, chutes or slides for calcined raw meal require a slope of at least 60°. These chutes have been used, but their slope imposes constraints on the relative vertical positions of the kiln inlet and the calciner outlet, as the horizontal distance is in practice dictated by the location of the already existing preheater tower. The required height of the calciner outlet has a huge impact on the installation costs for the calciner and the chute. Further, with an increase of the height of the calciner, the length of the chute increases and thus the energy losses as well. One may consider an air-jet conveyor mechanism enabling a horizontal or even upward raw meal transportation, but operating costs increase significantly as either the air jet has to be preheated to the raw meal temperature of typically 850° C. to 1000° C. or the raw meal is cooled down by the air jet. In addition, the energy consumption for driving correspondingly dimensioned fans is non negligible as well as the installation costs. Conveying screws will not withstand the corrosion and must be cooled, which again requires reheating of the calcined raw meal.

A solution to the above summarized problem is a slide plate for a slide for Geldart group C materials (or other types of particulate matter), wherein the slide plate has a longitudinal axis. At this point it is noted that the application of embodiments of the invention is not limited to the RCC, but can instead be used in many other applications and enables to reduce construction heights being defined by conventional chute heights. The longitudinal axis is preferably essentially parallel to the conveying direction of the Geldart group C material being transported using the slide plate. The slide plate ('plate', for short) has an up-facing surface for supporting a Geldart group C material, such as e.g., hot calcined raw meal. The plate further has a lower surface, which is as well referred to as downward-facing surface. The lower surface may be at the opposite side of the plate than the up-facing surface. The plate further has a front-side surface facing preferably at least essentially towards the conveying direction and a rear-side surface facing preferably at least essentially against the conveying direction. The front-side surface and the rear-side surface may connect the up-facing surface and the lower surface. The slide plate is preferably made of and/or at least include a ceramic refractory. The ceramic refractory has a number of through holes providing a fluid communication between fluid inlets in the lower surface and fluid outlets in the up-facing surface. This slide plate allows to provide a preferably very gentle gas flow, which flows essentially in between of the up-facing surface and a Geldart group C material that may be deposited on top of the up-facing surface. The gas flow almost forms a gas cushion in between of the Geldart group C material and the up-facing surface, thereby reducing the critical angle of the slide for the Geldart group C material on the plate. In practice the gas cushion is not perfect, as gas finds its way through the bed of the Geldart group C material. The process is, however, believed to be understood as a bed of Geldart group C material being formed by coherence of the material floating on the gas cushion. This picture is obviously simplified but already provides an idea why the slope of the slide can be reduced significantly below 60° relative to the horizontal.

Embodiments of the invention can be used not only for conveying hot Geldart group C materials, but as well to convey cold Geldart group C Materials, e.g., uncalcined raw meal. The embodiments of the invention can for example as be used in a preheater tower of a cement clinker line to connect/convey raw meal from one preheater stage to the next one. In this example the height of the preheater tower can be reduced, which again leads to a significant reduction of the construction costs.

Only to avoid misunderstandings, the critical angle of the slide is the angle at which the Geldart group C material starts sliding over the grate plate, i.e., at lower inclinations of the up-facing surface of the slide plate, the Geldart group C material accumulates on the slide plate, while at steeper angles, the Geldart group C material slides down the slide plate.

In an example of an embodiment, a distance d between the boundaries limiting at least one of the through holes in the conveying direction may be at or in between of 0.75 mm and 0.01 mm, hence 0.75 mm≥d≥0.01 mm; preferably 0.5 mm≥d≥0.05 mm, even more preferred 0.25 mm≥d≥0.08 mm. The relatively small dimension d of the through holes ensures that the flow rate through the plate may be low and that the pressure difference, i.e., the pressure drop, between the pressures below the lower surface and the up-facing surface of the plate may be greater than the pressure drop between the bottom of the Geldart group C material on the up-facing surface and the space above the Geldart group C material. Hence, the gas flow may essentially be defined by the slide plate and the flow inhomogeneities may be reduced. Example values of the distance d may be d=0.1 mm or d=0.2 mm, hence particularly preferred 0.2 mm≥d≥0.1 mm.

In an example embodiment, at least one of the through holes (particularly preferred the majority of the through holes or even all through holes) maybe a slot with a slot width w and a slot clearance d, wherein the slot width w extends perpendicular within an angle of ±α and α∈{45°, 40°, 30°, 15°, 10°, 5°, 2.5°, 1°, 0°} to the longitudinal axis and wherein the slot width w may be greater than the slot clearance d, (w>d). For example, the width w may be a number n of times greater than the clearance d (d·n=w) and n>m, m∈{25, 50, 75, 100, 150}. These slots provide for a homogenous air cushion below the particulate matter, which may be even a Geldart group C material.

The slot clearance d is thus at least essentially the distance d between the boundaries limiting at least one of the through holes, namely the respective slot in the conveying direction.

In operation, the slide plate may preferably have a gas flow rate $j_g$ through the slide plates at or below 0.1 Nm³ per second [s] and area [m²] of the support surface of the plate, i.e.

$$j_g \leq 0.1 \frac{Nm^3}{m^2 s},$$

wherein Nm³ stands for a cubic meter of the gas under normal conditions, being standard pressure $p_N$=1013.25 hPa and standard temperature T=0° C. and m² references to the size of the support surface of the slide plate.

In an example of the embodiment, the gas flow rate may be at or below one of $$0.5 \frac{Nm^3}{m^2 s}, 0.25 \frac{Nm^3}{m^2 s}, 0.1 \frac{Nm}{m^2 s}, 0.075 \frac{Nm^3}{m^2 s}, 0.05 \frac{Nm^3}{m^2 s},$$
$$0.025 \frac{Nm^3}{m^2 s}, 0.02 \frac{Nm^3}{m^2 s}, 0.01 \frac{Nm^3}{m^2 s}, 0.001 \frac{Nm^3}{m^2 s}.$$

Lower values are preferred. These low gas flow rates may be sufficient to significantly reduce the critical angle of the slide for the Geldart group C material on the slide plate, thereby reducing fan installation and operating costs. Further, potentially unintended interaction between the gas and the particulate matter, an example of which are Geldart group C materials, may be reduced. In the example of conveying hot raw meal, e.g., from a calciner outlet to a kiln inlet, cooling of the hot raw meal is reduced, even if gas at ambient or only slightly elevated temperatures is used to form the gas cushion. In an example embodiment, the gas may be heated prior to injection it into the through holes of the slide plate. In practice the support surface of the slide plate may be the portion of the up-facing surface onto which the particulate matter slides in operation of the slide. For example, the slide plate may be located to separate an upper channel and a lower channel of a slide segment or a slide, wherein the bottom surface of the upper channel may be provided by at least a portion of the slide plate's up facing surface. The portion of the slide plate contributing to the bottom surface may be the support surface of the slide plate. In a functional language, the portion of the slide plate may be configured to support the particulate matter to be conveyed by the slide may be the support surface. In some examples, the entire up-facing surface may be considered as the support surface. In other examples, the slide plate may extend into a slot of a side wall of the slide, e.g., into a slot defined by refractory cladding of the slide. In these other examples, the portion of the up-facing surface which engages into the slot may preferably not be configured to support the particulate matter and hence this engaging portion does not contribute to the support surface of the slide plate. In operation, the Geldart group-C material slides down the upper channel and gas reducing the friction between the slide surface and the Geldart group-C material may be provided via the lower channel to the through holes in the at least one slide plate.

Preferably, the support surface may be a strip surface extending at least essentially in the center of the up-facing surface and connecting the front-side surface and the rear-side surface. The width of the strip may be defined by the spacing of sidewalls of the slide. In case these side walls are not (yet) present, the width of the strip may be defined by the width of the area having the through holes.

Preferably, the pressure gradient $\Delta p_\uparrow$ between the bottom-facing surface of the slide plate and the up-facing surface of the slide plate may be smaller than or equal 2 kPa. In case the slide plate separates a lower ventilation channel extending below the slide plate from an upper channel above the slide plate, the pressure gradient may be $\Delta p_\uparrow = p_l - p_u \leq 2$ kPa, wherein $p_l$ and $p_u$ denote the gas pressures in the lower and the upper channels, respectively. Particularly preferred, the pressure gradient $\Delta p_\uparrow$ may be smaller than these 2 kPa, e.g., $\Delta p_\uparrow \leq 1.5$ kPa, $p_\uparrow \leq 1$ kPa, $p_\uparrow \leq 0.75$ kPa. A lower boundary for the pressure gradient can be found experimentally: If the Geldart group C material flow stops or fluctuates the lower boundary is found. The lower boundary depends on the Geldart group C material to be conveyed, the surface roughness of the slide plate and the thickness of the layer to name most relevant factors. Further, the lower boundary decreases with an increasing slope angle of the slide. Obviously, if there is no pressure gradient $\Delta p_\uparrow$ the gas flow through the through holes stops, i.e., $\Delta p_\uparrow > 0$ Pa, preferably $\Delta p_\uparrow \geq 10$ Pa, $\Delta p_\square \geq 0.1$ kPa, $\Delta p_\uparrow \geq 0.5$ kPa or $\Delta p_\uparrow \geq 0.6$ kPa.

In an example embodiment, the slide plate may have a fluid outlet of at least one of the through holes that may be closer to the front-end side surface than the fluid inlet of said at least one of the through holes. The gas flow exiting the through hole thus may have a momentum in the conveying direction. Accordingly, the gas flow or at least a portion of the gas flow follows the up-facing surface of the slide plate in the conveying direction (Coanda effect). In a particular preferred example embodiment, at least the forward boundary of the through hole, i.e., at least the wall segment defining the forward-facing end of the through hole, merges at least essentially tangentially into the up-facing surface. Thereby, the gas flow adheres particularly well to the up-facing surface, enabling to further reduce the gas flow rate and hence maintain an even higher temperature of the Geldart group C material on the up-facing surface of the plate.

Preferably, the bottom side of the slide plate has at least one recess and/or protrusion providing a first stop surface facing towards the front-end side surface and/or a second stop surface facing towards the rear-end surface. This recess and/or protrusion enable/s to define the location of the slide plate on an inclined support structure having corresponding protrusions and/or recesses, respectively. The support structure may be referred to as a slide plate support.

The slide plate may be used as a support plate for hot Geldart group C materials of a conveyor slide ('slide', for short). For example, the slide may include a housing with a housing wall and the housing wall may enclose a circumferentially closed channel. The housing may include a slide plate support, supporting the slide plate in the channel. The slide plate may separate at least a segment of the channel into an upper channel and a lower channel. The lower surface may provide a ceiling of the lower channel. The up-facing surface may provide a bottom of the upper channel. The at least one through hole of the at least one slide plate provides for a fluid communication between the upper channel and the lower channel. The channels can as well be referred to as conduits, i.e., they have at least essentially parallel channel axes.

For example, the slide plate support may be a refractory cladding inside the housing, thereby defining the width of the channel. This width may as well be width w of the strip surface of the slide plate being mentioned above.

A first side portion of the lower surface may reside on a first portion of the slide plate support. A second side portion of the bottom side surface may reside on a second portion of the slide plate support. Thus, a middle portion of the lower surface may be in between of the first side portion and the second side portion. This middle portion provides the lower end of the (at least one) through hole in the slide plate.

As indicated above, the slide plate may include at least one recess and/or protrusion, e.g., at its bottom side. The slide plate support, e.g., the refractory cladding may have at least one protrusion and/or recess, respectively, wherein the protrusion engages into the recess and provides for a positive locking of the slide plate on the slide plate support. Thereby the slide plate can be maintained at its intended position.

The up-facing surface of the at least one slide plate may support a refractory cladding of the upper channel. For example, the slide plate may as well or alternatively have at least one protrusion and/or recess on its up-facing side. This protrusion and/or recess may engage into and/or be engaged by a recess or a protrusion, respectively, of a refractory cladding, thereby preventing the refractory cladding and the slide plate from sliding relative to each other.

The extension of the at least one protrusion parallel to the longitudinal axis may preferably be at least 1 mm smaller, preferably at least 2 mm smaller than the extension of the recess into which the protrusion engages as well measured parallel to the longitudinal axis. The slide plate support and the slide plate can thus move relative to each other within the boundaries of the gap being defined by the difference of the extension parallel to the longitudinal axis. This increases the longevity of the slide as tensile stress is reduced. Similarly, in case of a protrusion-recess engagement between the slide plate and a refractory cladding above the slide plate, the extension of the at least one protrusion parallel to the longitudinal axis may be preferably at least 1 mm smaller, preferably at least 2 mm smaller than the extension of the recess into which the protrusion engages as well measured parallel to the longitudinal axis.

In an example embodiment, the up-facing surface of at least one, at least two or of all the sliding plate(s) has/have a slope smaller than 25° relative to the horizontal. Preferably, the slope may be smaller than 20° or 15° or 12° relative to the horizontal. 10° has shown in experiments as a slope still enabling a safe transport of the hot Geldart group C material and a very low gas flow, i.e., very low cooling losses. The lower limit for the minimum slope angle still providing for reliable transport depends on the gas flow rate and the material to be conveyed. According to presently available experimental data, but without being bound to theory or the data, it is believed that about 5° (or even slightly lower, e.g., 4°, 3°) can be considered as a lower boundary for Geldart group-C materials such as, e.g., raw meal, but operation at these low slope angles requires as an increase of the gas flow rate per surface area through the through holes. Such increase can be obtained by increasing the pressure drop $p_↑$, if necessary, above the maximum values indicated herein. Such an increase of the gas flow rate has the disadvantage of an increase in operation cost and in case hot Geldart group-C material may be conveyed that cooling of the conveyed material may be enhanced, unless the gas is heated prior to be injected into the through holes. The slope may be lowered further, e.g., by anti-stiction coatings of the up-facing surface, a further reduction of the axial distance of the through holes or other measures reducing the friction between the slide and the material to be conveyed.

Further, the most upstream slide plate or number of upstream slide plates may have a slope being greater than the slope of at least one of the at least one downstream slide plates. This increased angle ensures that the hot Geldart group C material starts slipping over the most upstream grate plate(s). Stiction may be overcome and subsequently the reduced slope may be sufficient to maintain the Geldart group C material in motion while keeping the gas flow through the through holes low.

In addition or alternatively, the most upstream slide plate or number of upstream slide plates may have more through holes and/or through holes with an increased cross section than at least one of the at least one downstream slide plates. Both measures increase the gas flow rate per surface area of the at least one respective upstream slide plate at a given pressure differential between the upper and the lower side of the slide plate and thereby contribute to avoid congestions of the slide, while keeping the gas flow through the downstream slide plates small. Experiments have shown that the risk for slide congestions may be higher in the vicinity of the inlet portion of the slide than in the middle section of the outlet portion. Thus, the risk for slide congestions can be significantly reduced by increasing the slope of (only) the upstream and/or a (preferably small) number of upstream slide plates, as suggested in the previous paragraph and/or by increasing the gas flow per surface area through this upstream or a (preferably small) number of upstream slide plates. The still small total gas flow through the slide plates contributes to low operating costs and further in case of conveying a hot Geldart group-C material unintended cooling by the gas flow may be maintained at a very low level.

Another possibility to increase the gas flow through only the most upstream slide plate or number of upstream slide plates may be to separate the lower gas channel extending at the lower side of the slide plates in at least two compartments, e.g., by a separating wall. Hence the lower gas channel may have an upstream compartment below the upstream slide plate(s) and a downstream compartment below the upstream slide plate(s). The upstream compartment and the downstream compartment may be separated by the separation wall. By providing a higher gas flow per slide surface to the compartment below the upstream slide plates than to the compartment below the downstream slide plates the gas flow through the upstream slide plate(s) can be increased, in addition or alternatively to other measures.

The upper channel of the slide preferably includes at least one gas opening, wherein the gas opening may be connected via at least one control valve to a compressed gas source, as well referred to as "reservoir of compressed gas" or "compressed gas reservoir". The compressed gas source may be configured to provide a gas at a pressure above the gas pressure in the upper channel when the control valve is closed. Example values for the gas pressure provided by the gas source when the valve is closed may be at or above 50 kPa, and/or 100 kPa and/or 200 kPa and/or 300 kPa and/or 400 kPa and/or 500 kPa and/or 750 kPa and/or 1 MPa above the pressure $p_u$ in the upper channel. A fluid line may connect the compressed gas source and the gas opening. The control valve may be configured to control the gas flow from the compressed gas source to the gas opening in the upper channel. In other words, the control valve may be located in the fluid path from the compressed gas reservoir to the gas opening in the upper channel. Opening the control valve enables to provide a burst of gas to flow from the compressed gas source through the at least one gas opening. This burst of gas may serve to unclog the upper channel in case of being congested. The duration of the burst of gas may preferably be short, e.g., smaller or equal to 200 ms and/or 300 ms and/or 500 ms and/or 1 s and/or 2 s and/or 3 s and/or 4 s and/or 5 s and or 10 s.

As already apparent, the at least one gas opening may preferably be located at the upstream end of the upper channel and/or in at least one of the side walls in the upper third, quarter, fifth or tenth part of the slide. In an example embodiment the gas opening may be located in a part of the side wall delimiting the upper channel. In a particularly preferred example embodiment the opening may be located in a part of the side wall being adjacent to the most upstream or the second most upstream slide plate.

The cross section of the at least one gas opening may be a multiple of a cross section of a through hole in the slide plates, e.g., greater or equal than 10 times and/or 20 times and/or 50 times and/or 100 times, 200 times and/or 500 times than the cross section of a through hole of the slide plates. Hence, the gas flow through the gas opening can be much higher than the gas flow through a through hole in a slide plate.

Multiple slide plates may be aligned to form a slide surface. In an example embodiment, a gasket or any other kind of seal may be located in between of aligned slide plates. Thereby, an unintended gas flow from below the slide plate into the particulate matter can be avoided and the power requirement of the fans for operating the slide may be further reduced. Further a potentially unintended interaction of the gas with the particulate matter (e.g., cooling) may be reduced as well.

The slide plates can be manufactured by casting a slip (including engobes) of a ceramic refractory in a mold having at least a bottom and side walls. After curing, the such obtained greenware may be subjected to a heat treatment, often referred to as "firing". The heat treatment converts the greenware into a ceramic refractory material. This method hence enables to provide a heat resistant slide plate of a ceramic refractory.

In an example embodiment, a positive form may be inserted into the mold prior to curing the slip into greenware. The shape of the positive form preferably corresponds to the shape of at least one of the through holes of the slide plate to be manufactured. In this sense, the positive form may be a positive form of at least one through hole.

The positive form may be made of a heat degradable material, e.g., of a cellulose-based material and/or of polymer-based material such as, e.g., plastic. In this context any material which disintegrates during the heat treatment for converting the greenware into a ceramic may be considered heat degradable. The degradation may be due to evaporation and/or a chemical reaction such as, e.g., burning, pyrolysis or the like. Alternatively, the positive form may be made of a soluble material, enabling to dissolve the positive before or after firing the greenware. In all these cases, the at least one positive form may disintegrate during the heat treatment and/or while being subjected to a corresponding solvent and due to the disintegration frees the corresponding at least one through hole during the heat treatment. Hence, after the heat treatment and/or the treatment of the semi-finished slide plate with the solvent, the slide plate may have a through hole at the location and orientation where the at least one positive form was located prior to the heat treatment. For example, many polymeric plastics can be considered as heat degradable material.

The at least one positive form can be held in place and hence be supported by a rack extending above the mold. In addition or alternatively, the mold may have at least one support opening configured to receive an end section of the at least one positive form. Thus, when mounted, a portion of the positive form may engage into the support opening, thereby being supported by the mold in a predefined location and in a predefined orientation. An advantage of this method may be that the at least one positive form extends over the inner contour of the mold and hence after deforming of the greenware over the contour of the slide plate. Thereby, it can be avoided that the through hole is unintendedly plugged by greenware and subsequently by refractory.

The problems mentioned initially may as well be solved by a method of conveying hot Geldart group C material on a slide with a slide surface having at least one, preferably a number of through holes. The method may include depositing the Geldart group C material on an up-facing surface of the slide, e.g., on an up-facing side of a slide plate. The method may further include the step of providing a gas flow rate $j_g$ of or less than 0.5 Nm³ of gas per second [s] and surface area [m²] of the slide surface through the holes to an up-facing surface of the slide, N representing the normal conditions. In preferred examples $j_g$ may be at or below one of $$0.5 \ \frac{Nm^3}{m^2 s}, 0.25 \ \frac{Nm^3}{m^2 s}, 0.1 \ \frac{Nm^3}{m^2 s}, 0.075 \ \frac{Nm^3}{m^2 s}, 0.05 \ \frac{Nm^3}{m^2 s},$$
$$0.025 \ \frac{Nm^3}{m^2 s}, 0.2 \ \frac{Nm^3}{m^2 s}, 0.01 \ \frac{Nm^3}{m^2 s}, 0.001 \ \frac{Nm^3}{m^2 s}.$$

In other words, in at least one implementation of the invention, the slide plate is located in between the lower channel and the upper channel and provides a boundary between the lower channel and the upper channel, while at least a portion of the up-facing surface provides a bottom surface of the upper channel and configured such that a gas flow through the slide plate is below a value represented by a ratio of half a cubic meter of gas under normal conditions per second to an area of the bottom surface of the upper channel. Here, the normal conditions are defined by a standard pressure $p_N=101.325$ kPa and a standard temperature $T=0°$ C.

In summary, the claimed embodiments invention enables to reduce the angle of slides for conveying hot Geldart group C powders, e.g., calcined raw meal, down to about 20° or even below (measured relative to the horizontal). Some of the advantageous embodiments being described in the dependent claims enable to reduce the angle even further to about 10°, thereby reducing installation costs and due to the low gas flow through the through holes as well operating costs.

BRIEF DESCRIPTION OF THE DRAWINGS

In the following, the invention will be described by way of example, without limitation of the general inventive concept, on examples of embodiment and with reference to the drawings.

Generally, the drawings are not to scale. Like elements and components are referred to by like labels and numerals. For the simplicity of illustrations, not all elements and components depicted and labeled in one drawing are necessarily labels in another drawing even if these elements and components appear in such other drawing.

While various modifications and alternative forms, of implementation of the idea of the invention are within the scope of the invention, specific embodiments thereof are shown by way of example in the drawings and are described below in detail. It should be understood, however, that the drawings and related detailed description are not intended to limit the implementation of the idea of the invention to the particular form disclosed in this application, but on the contrary, the intention is to cover all modifications, equivalents and alternatives falling within the spirit and scope of the present invention as defined by the appended claims.

DETAILED DESCRIPTION

Figure 1:
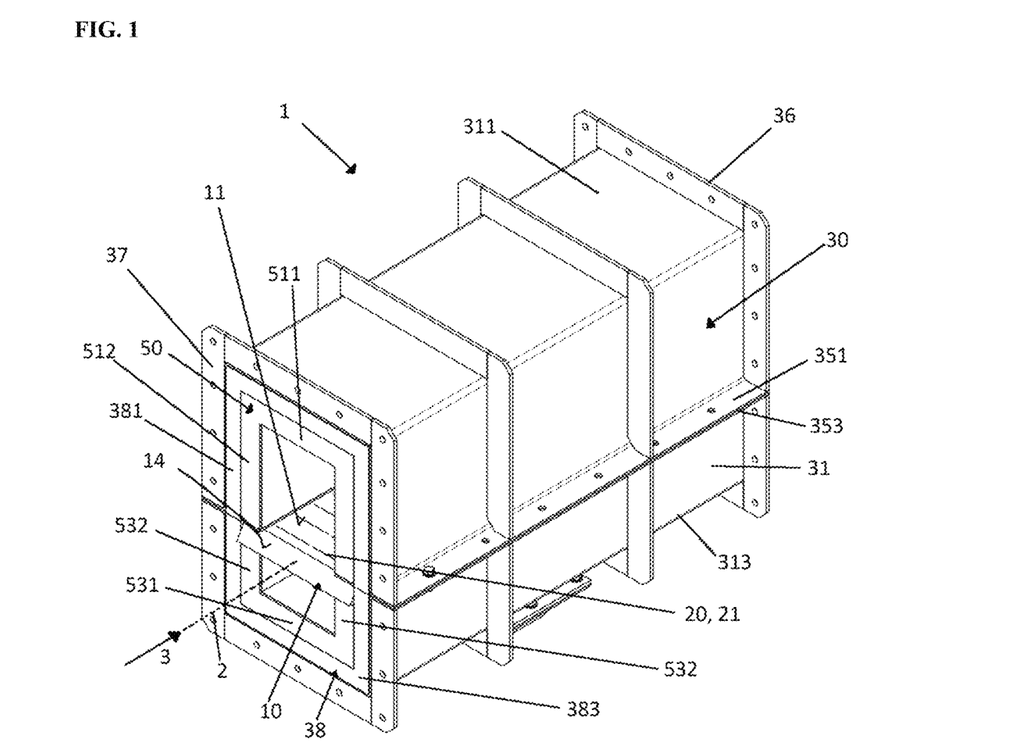
FIG. 1 presents a perspective view of a slide segment of a slide for a Geldart group C material.

The segment of the slide 1 in FIG. 1 may as well be considered as a short slide 1, but in practice mostly a number of the depicted segments may be connected to form a longer slide for a Geldart group C material. Thus, a slide 1 may have a number (at least one) of the depicted segments. The slide 1 extends at least essentially parallel to the longitudinal axis 2 and may be configured to convey a Geldart group C material in the conveying direction 3.

The slide in FIG. 1 has a housing 30 with a housing wall 31. The housing wall 31 may be, e.g., of sheet metal, being easy to process. The housing wall may preferably have an upper housing portion 311 and a lower housing portion 313, which may be (preferably releasably) attached to each other thereby enclosing a channel with an upper portion 41 and a lower portion 43 (see FIG. 3). As shown, the upper housing portion 311 and the lower housing portion 313 may have an upper flange 351 and a lower flange 353, respectively, enabling to (preferably releasably) attach the upper housing portion 311 and the lower housing portion 313 to each other. In addition or alternatively, the slide 1 may have a front-end flange 36 and a rear end flange 37. Preferably, the front face of the front-end flange 36 may be a at least a portion of a projection of the rear face of the rear end flange 37 parallel to the longitudinal axis 2. This cases to connect slides 1 together by simply connecting the front-end flange 36 of a first slide 1 to a rear-end flange 37 of a second slide 1, thereby forming a correspondingly longer slide 1 and converting the first and the second slides 1 into slide segments. Of course, the rear face of the rear-end flange 37 may as well be a portion of a projection of the front face of the front-end flange 36 parallel to the longitudinal axis 2.

Figure 3:
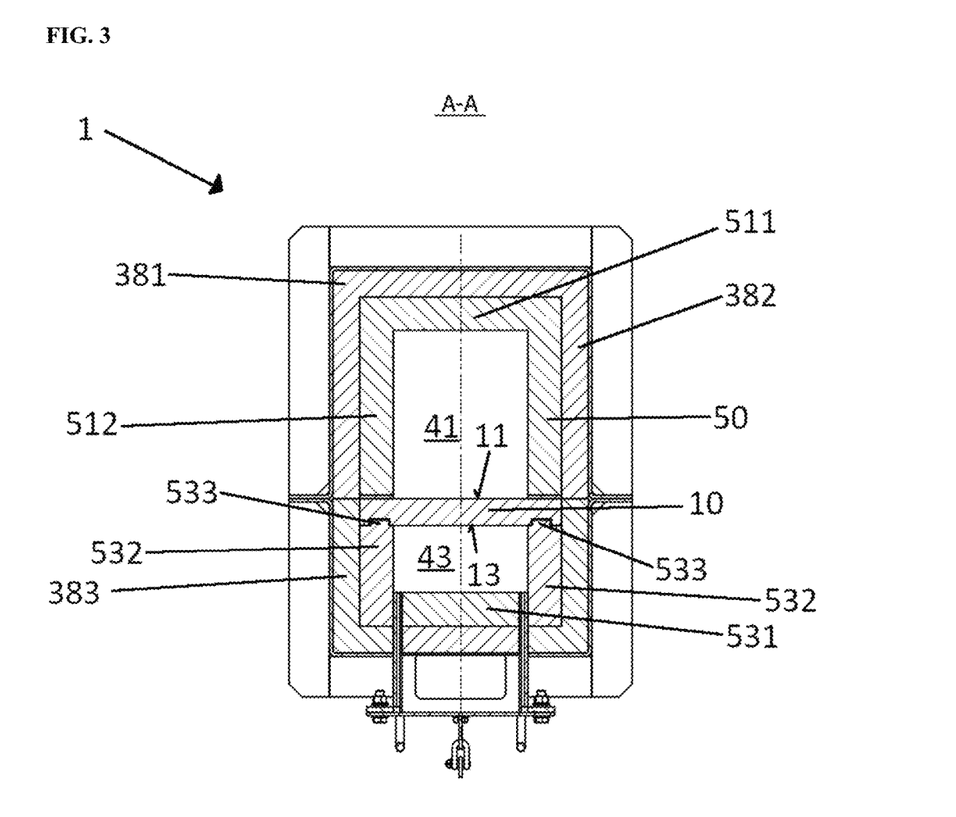
FIG. 3 presents a cross sectional view of the slide segment on the plane A-A as indicated in FIG. 2.

Inside the housing wall 31 may be an insulation layer 38, as shown in particular in FIGS. 1 and 3. The insulation layer 38 may be, e.g., of a Calcium Silicate material or of any other material having a low heat transfer coefficient. In an example embodiment, the insulation layer 38 may be made of or include microporous insulation material, these materials offer rather low thermal conductivities K in the range of approximately $$0.02 \le \kappa \le 0.05 \ \frac{W}{mK}.$$

When using conventional isolation material, the thickness of the insulation layer 38 may be increased accordingly.

The insulation layer 38 has an upper insulating portion 381 may be located in the upper portion of the housing wall 311 and a lower insulating portion 383 may be located in the lower portion of the housing wall 313. Each of the two insulation portions forms a U-profile with a middle leg to which two side legs may be attached. If mounted, as shown in FIGS. 1 and 3, the free ends of the side legs of the upper insulation portion may face the corresponding free ends of the side legs of the lower insulation portion.

Figure 4:
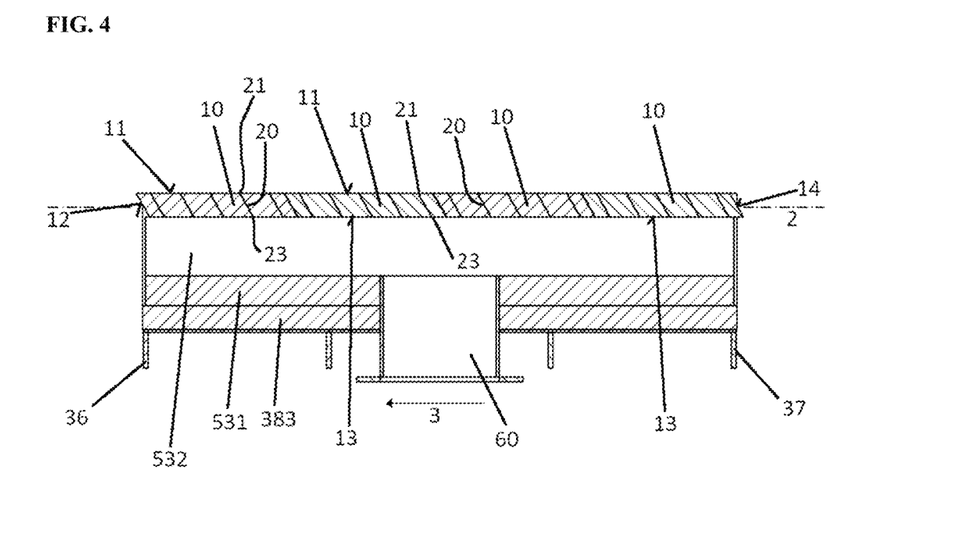
FIG. 4 presents a longitudinal sectional view of a lower portion of the slide segment.

The housing 30 may preferably have a refractory cladding 50. The upper housing portion may have an upper cladding and the lower portion housing may have a lower cladding. As can be seen in FIG. 4, the refractory cladding 50 protects the optional insulation layer 38 from abrasion by the Geldart group C material. In case the insulation material 38 has been omitted the optional refractory cladding 50 may protect the housing wall 31. Thus, the refractory cladding 50 may be inside the housing wall 31. The optional insulation material 38 may be in between of the refractory cladding 50 and the housing wall 31.

The lower portion of the refractory cladding may have a U-shaped cross section with a cladding middle leg 531 and two cladding side legs 532. The cladding middle leg 531 may be supported on the up-facing surface of the middle leg of the optional lower insulating portion 383, as shown. In case the insulating portion 383 has been omitted, the cladding middle leg may be supported on or by the bottom of the lower portion of the housing wall 313. The two cladding side legs 532 of the lower portion of the refractory cladding 53, lower cladding side legs 532, for short, may extend towards the upper portion of the housing wall 311. The lower cladding side legs 532 may each provide an up-facing surface. The up-facing surface of the cladding side legs 532 may support a slide plate 10.

The slide plate 10 extends along the longitudinal axis 2 and has an up-facing surface 11 for supporting a Geldart group C material, such as, e.g., hot calcined raw meal. The slide plate 10 as well has a lower surface 13 (as well referred to as downward-facing surface 13), a front-side surface 12 and a rear-side surface 14. The slide plate 10 may be made of a ceramic refractory.

The lower surface 13 of the plate 10 has side portions which may reside on the lower cladding side legs 532. Thus, the lower cladding side legs 532 may support the slide plate 10.

The lower cladding portion and the slide plate 10 may enclose a lower channel 43. For example, the lower channel 43 may be delimited by a center stripe of the lower surface 13 of the slide plate 10, the inwards facing surfaces of the lower cladding side legs 532 and the up-facing surface of the lower cladding middle leg 531 (see FIGS. 4 and 5). The center stripe of the lower surface 13 of the plate 10 may thus be in between of the side portions of the lower surface 13 of the plate 10 residing on the up-facing surfaces of the lower cladding side legs 532 (see FIG. 3).

Figure 5:
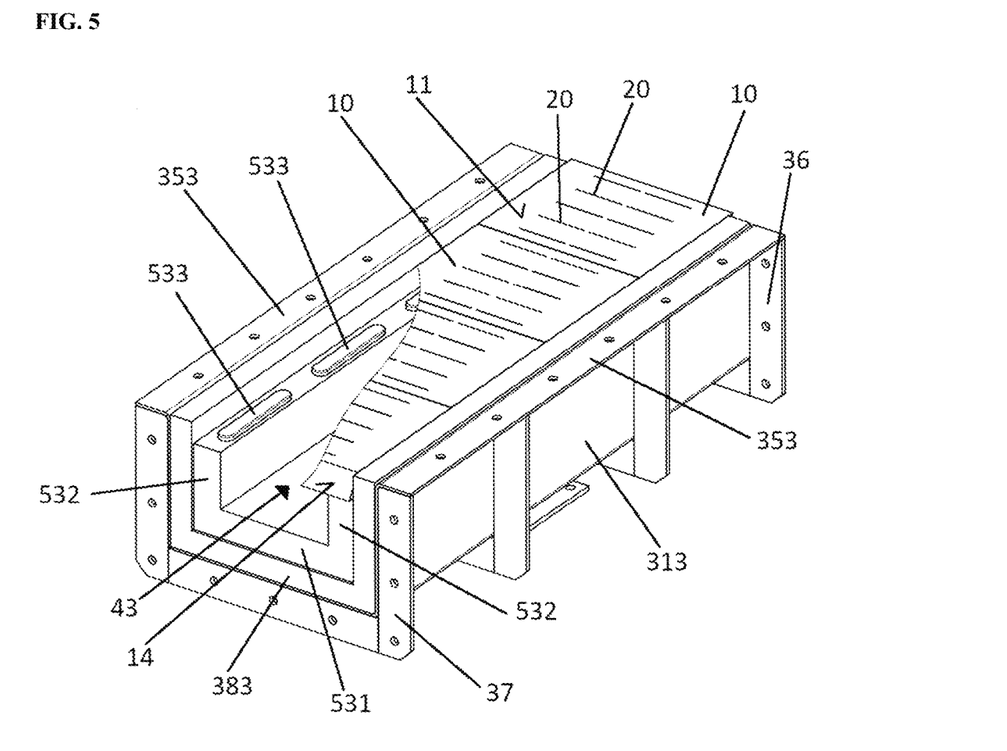
FIG. 5 presents a perspective view of a lower portion of the slide segment.

As can be seen in FIG. 4 and FIG. 5 the lower cladding side legs 532 may have protrusions 533 engaging in complementary shaped recesses 123 in the lower surface 12 of the slide plate, preventing the slide plate 10 to slide parallel to the longitudinal axis 2. The maximum extension of the protrusions may be slightly smaller than the space provided by the corresponding recess to thereby allow the slide plate 10 to float with the limits given by the distance between the extensions of the protrusions and the recesses on the lower refractory side legs 532. In between of the up-facing surface 11 of the slide plate 10 and the upper cladding side legs may be a gasket.

The housing may further form an upper channel 41. Like in the depicted example, the housing may have an upper cladding 51. The upper cladding may have an inverted U-shape with a middle leg 511 from which two side legs 512 extend downwards to the up-facing surface of the slide plate 10. The lower side of the middle leg 511 defines the ceiling of the upper channel 41. A portion of the up-facing surface 11 of the slide plate, the so called center stripe of the up-facing surface 11 of the plate 10 provides the bottom of the upper channel 41 and the inward facing sides of the upper cladding side legs 512 define the width of the upper channel 41 and in this example as well the width of the center stripe. The width of the upper channel 41 may be at least essentially the same as the width of the lower channel 43.

As shown in FIGS. 4 and 5, the slide plate 10 may preferably have a number of through holes 20 extending from an inlet opening 23 in the slide plate's lower surface 13 to an outlet opening 21 in the slide plate's up-facing surface 11. Like in the depicted example embodiment, the through holes 20 may be slots with a slot width w extending at least essentially perpendicular to the longitudinal axis 2. The slot clearance d may be at least essentially constant along the slot width. As can be seen, the slot width w may preferably be a multiple m of the slot clearance d, wherein m may be greater than 1 and not necessarily an integer, i.e., m>1 and m∈R, wherein R denotes the set of real numbers. The through holes may be inclined in the conveying direction, i.e., the outlet opening 21 may be closer to the front-side surface 12 of the slide plate 10 than the inlet opening 23 of the respective through hole. This inclination of the through holes 20 has shown to reduce the gas flow rate required to maintain the Geldart group C material flowing.

It has been observed that the particles of Geldart group C materials form brittle but very soft clusters. These clusters may be considered as cohesion bound agglomerates of particulate matter. Without being bound to theorem the reduction of the critical angle may be believed to be caused by a gas cushion being formed by the gas flow between the slide plate and clusters of the bed of particulate matter. Holes, crevasses, or other kind of interstices have been observed to form between these clusters by the gas flow. The gas then flows through these interstices to the upper side of the bed being formed by the particulate material. Thus, the particulate material is not fluidized by the gas flow. The gas cushion so to speak reduces the cohesion of the particulate matter to the slide plate's top surface and hence reduces the friction. In other words, the gas flow via the through holes 20 provides for a reduction of the cohesion of the particulate matter to the top surface 11 of the slide plate 10 and hence reduces the friction between the top surface 11 and the bed of particulate matter. This reduced friction directly translates in a significant decrease of the required minimum slope angle of the slide. Slope angles of or below 25°, 20°, 15°, 12° and 10° have been found to be steep enough to reliably provide for conveying even Geldart group C materials. An increase in gas flow rate through the through holes provides for a reduction of the minimum slope angle for a reliable conveying of Geldart group C materials.

In operation, a flow of a Geldart group C material may be unloaded to a first end portion of the upper channel 41. The Geldart group C material may thus be deposited on the up-facing surface 11 of the slide plate 10. Further, the lower channel 43 may be provided with a gas pressure $p_l$, greater than the gas pressure $p_u$ in the upper channel 41, hence preferably $p_l > p_u$. Due to the pressure gradient $\Delta p_\square = p_l - p_u$, a gas flow through the through holes 20 may be provided. The gas flow reduces the cohesion between the Geldart group C material (or any other particulate matter) and the up-facing surface 11 of the slide plate 10. The Geldart group C material may thus slide down an only slightly inclined slide. Slightly inclined means herein that inclinations of or below 25°, 20°, 15°, 12° and 10° relative to the horizontal can be realized, some experiments showed a possible reduction down to 10° and slightly below this slope. These inclinations may be much smaller than the inclination of the prior art slides, which usually have a slope of at least 60° and contribute to a significant reduction of the construction costs of the corresponding plant.

Preferably, the housing 10 has an inspection and maintenance opening 60 being shown closed in FIGS. 1, 2, 3, 4 and 5. The opening 60 may as well be used as gas inlet opening to provide a gas flow to the lower channel 43.

Figure 6:
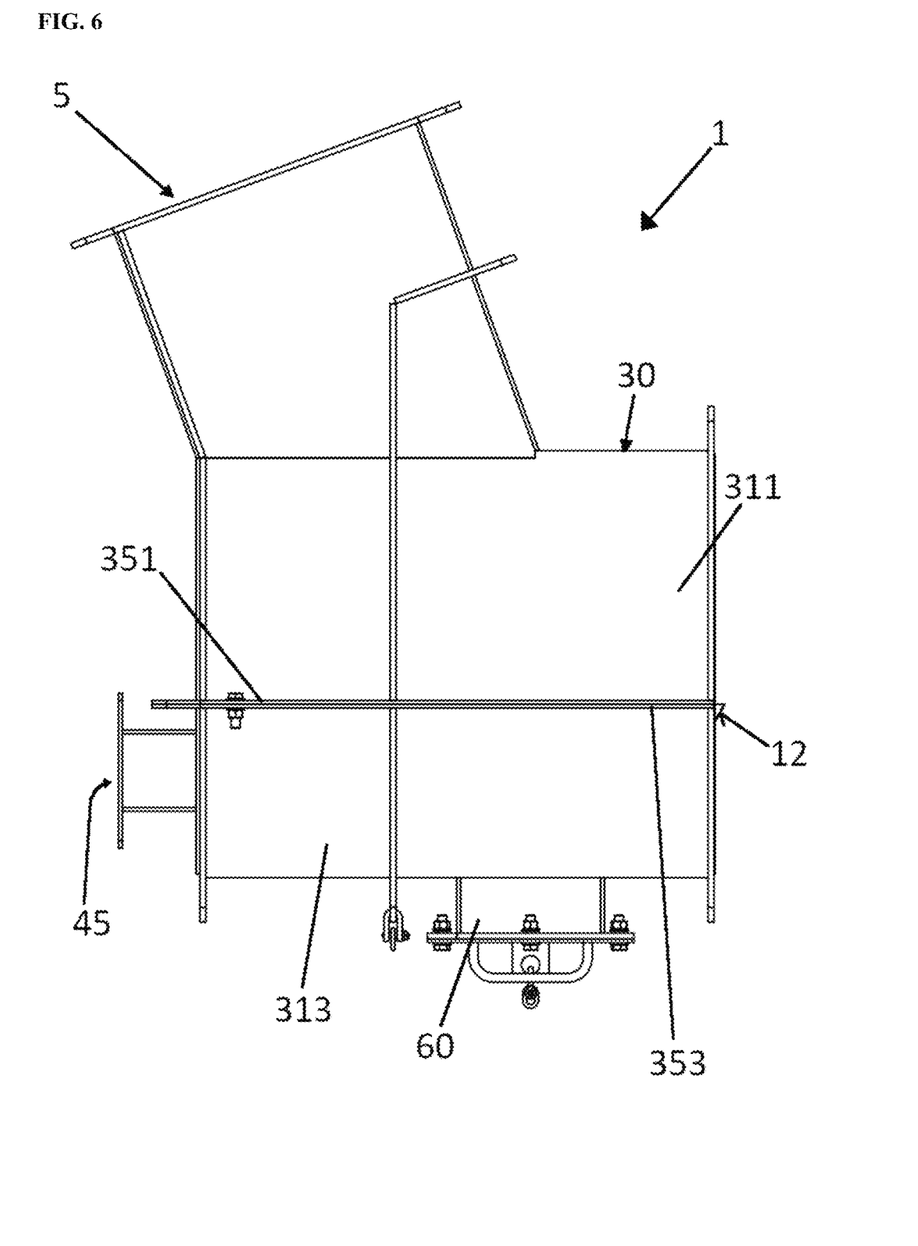
FIG. 6 presents a side view of another slide segment, which may be combined with the segment of FIGS. 1 and 2.
Figure 7:
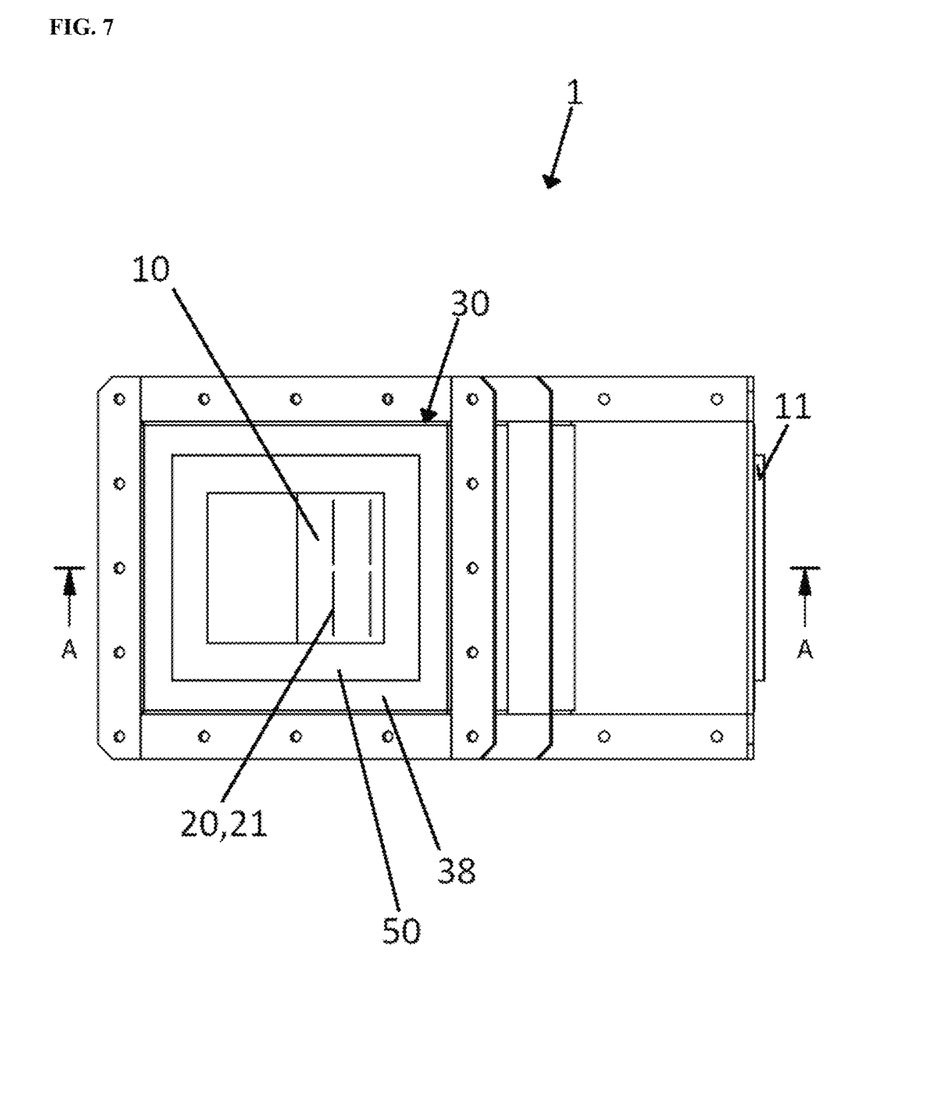
FIG. 7 presents a top view of the slide segment of FIG. 6.
Figure 8:
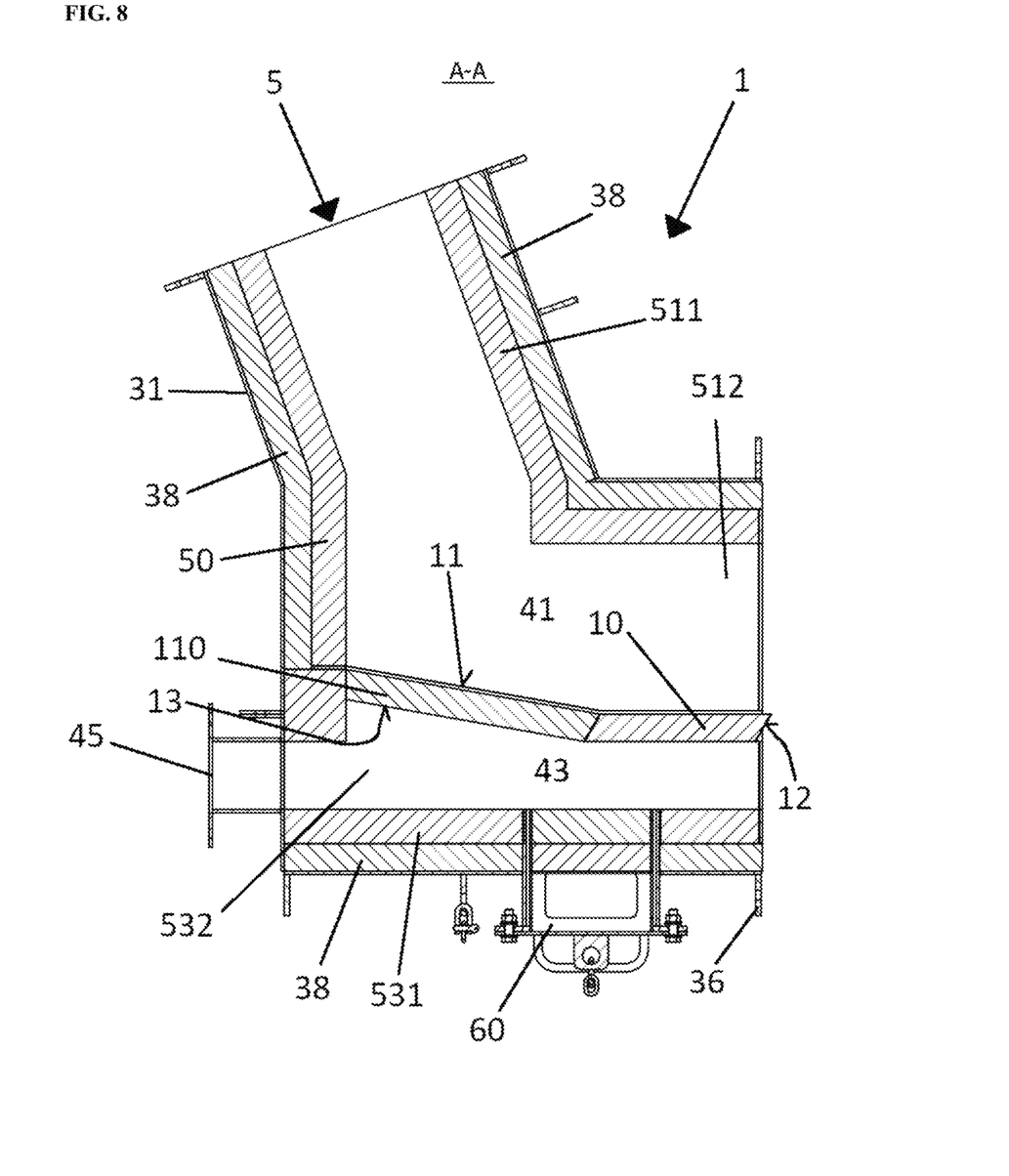
FIG. 8 presents a sectional view of the slide segment of FIGS. 6 and 7 along the plane A-A in FIG. 7.

FIGS. 6 to 8 show another slide segment 1 of a Geldart group C material conveying slide. The slide segment of FIGS. 6 to 8 may be mounted and may hence preferably be configured to be mounted to the rear end of a slide segment of FIG. 1. For example, the rear-end flange 37 of the slide segment of FIGS. 1 and 2 may be bolted to the front-end flange 36 of the another slide segment 1 as shown in FIGS. 6 to 8.

The slide segment in FIGS. 6 to 8 has a housing 30 with an inlet 5 for receiving particulate matter, e.g., a Geldart group C material. As can be seen best in FIG. 8, the inlet 5 may be above a slide plate 110 and enables to feed the particulate matter into an upper channel 41. The bottom of the upper channel 41 may be delimited by slide plates 110 and 10, having through holes 20 which are shown only in FIG. 6, as the section plane A-A extends through an optionally continuous land. The slide plates 110 and 10 may be essentially identical to the slide plates 10 of the slide segment in FIG. 1 to FIG. 3, details of which being depicted in FIGS. 4 and 5 and the description of the slide plates 10 as provided in the context of FIGS. 1 to 5 may be read as well on the slide plates 110 and 10 as shown in FIGS. 6 and 8.

The slide plate 110 in FIGS. 6 and 8 may be upstream of the slide plate 10 and may have preferably have a steeper slope angle than the downstream slide plate 10. This increased slope angle contributes to an even more reliable operation of the slide and reduced mean slope of the slide. Experiments showed that slide congestions (e.g., due to sticky particulate matter) start always at the upstream end of the slide. Once the particulate matter flows down the slide, lower angles (less steep slopes) may be sufficient to maintain even a Geldart group C material in motion. Thus, the steeper slope angle of the upstream slide plate 110 enables to further reduce the slope angle of subsequent slide plates 10, thereby further reducing the height required to install a slide with a given horizontal extension. In any embodiment the upstream slide plate 110 may have a higher number of through holes and/or through holes with a greater gross section than the immediate or another downstream slide plate. Both measures contribute to increase of the gas flow rate through the upstream slide plate 110 and thereby to reduce the risk of slide congestions.

Figure 2:
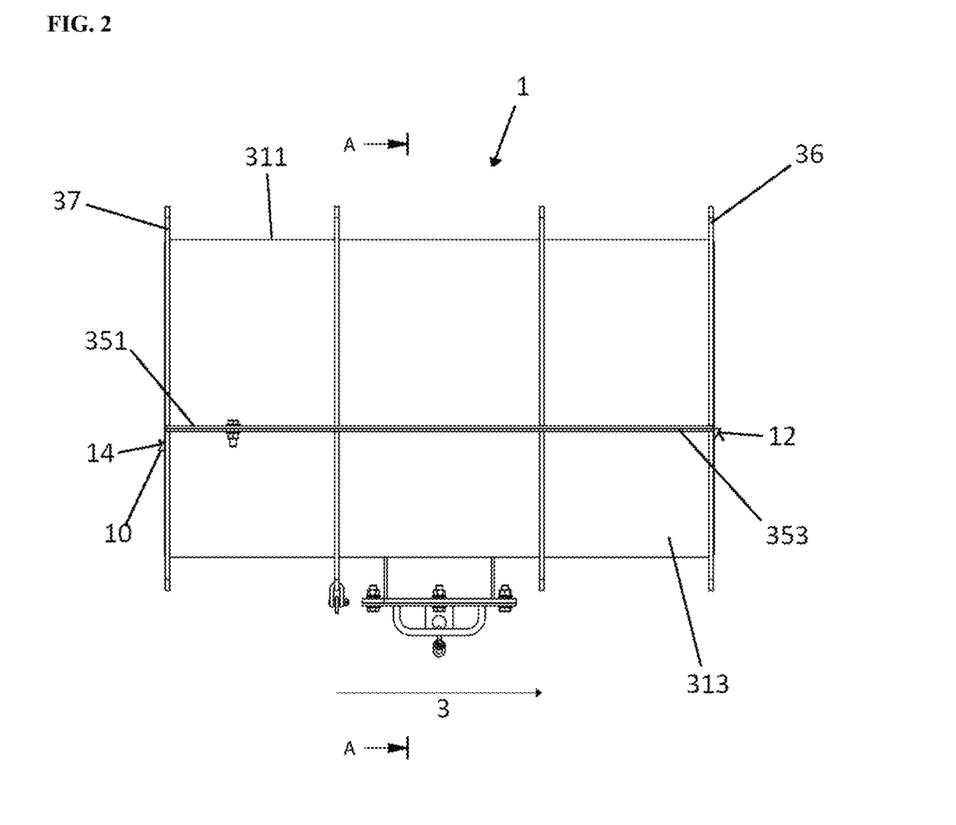
FIG. 2 presents a side view of the slide segment.

Very similar to the slide segment 1 in FIGS. 1 to 3, the upper channel 41 may be delimited to the top and to the sides by a refractory cladding 50 including upper cladding side legs 511 and upper cladding middle legs 512. In between of the outer housing wall 31 and the refractory cladding 50 may preferably be an insulation layer 38 (see FIG. 8).

The slide plates 110 and 10 in FIG. 8 separate the upper channel 41 from a lower channel 43. Hence the lower channel 43 extends below the slide plates 110 and 10. As well very similar to the lower channel in FIG. 3, the bottom and the sides of the lower channel 3 may be delimited by a lower cladding middle leg 531 in between of two lower cladding side legs 532. Again, an optional insulation layer 38 may preferably be located in between of the housing wall 31 and the portions of the lower cladding.

The lower channel 43 may extend into a gas inlet 45 and may hence be in fluid communication with the gas inlet 45 (see FIG. 8). By attaching a gas source to the gas inlet 45, a gas can be inserted into the lower channel 43 and thereby a pressure gradient between the lower channel 43 and the upper channel 41 can be provided. Accordingly, a portion of the gas may flow through the through holes 20 to the up facing surface 11 of the slide plates 110, 10 and may reduce the friction between the slide plates 110, 10 and the particulate matter which may have been inserted into the upper channel 41 via the particulate matter inlet 5.

As already apparent, already a single slide segment 1 be it the slide segment 1 of FIGS. 1 to 3 or the slide segment 1 of FIGS. 6 to 8 may each be used as a slide, if the distance via which material is to be conveyed is sufficiently short. In case the distance is longer, multiple slide segments may be attached to each other to thereby constitute an accordingly longer slide.

It will be appreciated to those skilled in the art having the benefit of this disclosure that this invention is believed to provide a slide plate and a slide for Geldart Group C materials. Further modifications and alternative embodiments of various aspects of the invention will be apparent to those skilled in the art in view of this description. Accordingly, this description is to be construed as illustrative only and is provided for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

GENERAL REMARKS

The terms "at least essentially constant", "at least essentially the same as" or the like as used above are to be understood that constant or the same dimensions, respectively, are preferred, but deviations from a nominal value can be accepted. Typically, acceptable deviations are within one of ±20%, ±15%, ±10%, ±5%, ±2.5% and ±1% wherein lower ranges of deviations are preferred.

The terms "at least essentially parallel", "at least essentially perpendicular" or "at least essentially orthogonal", respectively and the like as used above are used to indicate that parallel or perpendicular (orthogonal), respectively, is preferred but that deviations can be accepted. Typically, acceptable deviations from the intended direction or orientation, whatever applies, may be within one of ±30°, ±20°, ±15°, ±10°, ±5°, ±2.5° and ±1% wherein lower values are preferred.

LIST OF REFERENCE NUMERALS

1 slide (segment) for Geldart group C materials (segment of)
2 longitudinal axis
3 conveying direction
5 material inlet.
10 slide plate
110 slide plate
11 up-facing surface of the slide plate
12 front-end side surface of the slide plate
13 lower surface/downward-facing surface of the slide plate
14 rear-end side surface of the slide plate
20 through hole
21 fluid outlet
23 fluid inlet
30 housing
31 housing wall
311 upper portion of housing wall (deliming the upper channel)
313 lower portion of housing wall (deliming the lower channel)
351 upper flange
353 lower flange
36 front-end flange
37 rear-end flange
38 insulation layer
381 upper insulating portion
383 lower insulating portion
41 upper channel
43 lower channel
45 gas inlet of lower channel
50 refractory cladding
511 upper cladding middle leg
512 upper cladding side legs
531 lower cladding middle leg
532 lower cladding side legs
533 protrusions
60 opening

The invention claimed is:

1. A slide plate of a conveyor slide that has a housing enclosing a channel that extends in a conveying direction and that is configured to convey Geldart group C materials in the conveying direction, wherein:
the slide plate of said conveyor slide is dimensioned to be placed in the housing to separate at least a segment of the channel into an upper channel and a lower channel,
the slide plate having a longitudinal axis in the conveying direction, an up-facing surface facing the upper channel and configured to support the Geldart group C material, a downward-facing surface facing the lower channel, a front-end surface facing in the conveying direction, and a rear-end surface opposite the front-end surface,
the slide plate is made of a ceramic refractory and has through holes establishing fluid communication between fluid inlets of said through holes in the lower surface and fluid outlets of said through holes in the up-facing surface,
and
a fluid outlet of at least one of the through holes is closer to the front-end surface than a fluid inlet of said at least one of the through holes to generate, with a gas flow passing said through holes, a momentum in the conveying direction.

2. The slide plate of claim 1, wherein at least one of the through holes is dimensioned as a slot with a slot width w and a slot clearance d, wherein the slot width w extends substantially perpendicularly to the longitudinal axis in a direction within an angle of $\pm\alpha$, and $\alpha \in \{45°, 40°, 30°, 15°, 10°, 5°, 2.5°, 1°, 0°\}$ to the longitudinal axis, and wherein the slot width w is greater than the slot clearance d.

3. The slide plate of claim 1, wherein the slide plate has boundaries limiting the at least one of the through holes in the conveying direction and wherein a slot clearance d between first and second boundaries is below 0.75 mm.

4. The slide plate of claim 1, configured to have a pressure gradient $\Delta p_\uparrow$ between the up-facing surface and the downward-facing surface to be smaller than or equal to 2 kPa.

5. The slide plate of claim 1, wherein the down-facing surface has at least one recess and/or protrusion providing a first stop surface that faces towards the front-end surface and/or a second stop surface that faces towards the rear-end surface, wherein said first stop surface and/or said second stop surface is dimensioned to limit a movement in a direction parallel to the longitudinal axis.

6. A conveyor slide configured to convey hot Geldart group C materials, comprising at least one slide plate according to claim 1.

7. The conveyor slide of claim 6, wherein:
the conveyor slide comprises a housing with a housing wall, wherein the housing wall encloses a channel,
the housing has a slide plate support that supports the at least one slide plate in the channel,
the slide plate separates at least a segment of the channel into an upper channel and a lower channel, wherein the lower surface provides a ceiling of the lower channel and wherein the up-facing surface provides a bottom of the upper channel and wherein the through holes provide fluid communication between the upper channel and the lower channel.

8. The conveyor slide of claim 7, wherein the slide plate is located in between the lower channel and the upper channel and provides a boundary between the lower channel and the upper channel, wherein at least a portion of the up-facing surface provides a bottom surface of the upper channel, and configured such that a gas flow through the slide plate is below a value represented by a ratio of half a cubic meter of gas under normal conditions per second to an area of the bottom surface of the upper channel, wherein the normal conditions are defined by a standard pressure $p_N$=101.325 kPa and a standard temperature T=0° C.

9. The conveyor slide of claim 6, further comprising at least one slide plate support,
wherein the at least one slide plate is supported by said at least one slide plate support,
wherein the slide plate support comprises a refractory cladding thereby defining the width of a channel,
wherein a first side portion of the lower surface resides on a first portion of the at least one slide plate support and a second side portion of the lower surface resides on a second portion of the at least one slide plate support,
wherein a middle portion of the lower surface is in between a first side portion and a second side portion.

10. The conveyor slide of claim 9,
wherein the down-facing surface of the at least one slide plate has at least one recess and/or protrusion providing a first stop surface that faces towards the front-end surface and/or a second stop surface that faces towards the rear-end surface, wherein said first stop surface and/or said second stop surface is dimensioned to limit a movement in a direction parallel to the longitudinal axis,
wherein the at least one slide plate support has at least one support protrusion and/or support recess engaging into the at least one recess and/or protrusion of the slide plate, respectively,
wherein an extension of the at least one support protrusion parallel to the longitudinal axis is at least 1 mm shorter than an extension of the recess of the slide plate into which the at least one support protrusion engages, as measured parallel to the longitudinal axis.

11. The conveyor slide of claim 6, wherein the at least one slide plate includes multiple slide plates, the up-facing surface of the at least one slide plate has a corresponding slope smaller than 25° relative to the horizon, and/or the most upstream of the multiple slide plates has a corresponding slope that is greater than that of at least one downstream slide plate of the multiple slide plates.

12. The conveyor slide plate of claim 1, wherein the Geldart group C material is calcined, partially calcined, or uncalcined cement clinker raw meal.

\* \* \* \* \*